3,199,941
N-(2-BENZOTHIAZOYL)-1,4,5,8 DIAMINO DIHYDROXY ANTHRAQUINONES, MIXTURES AND SYNTHESIS THEREOF
André Albert Paul Simonnet, Creil, and Louis Antoine Cabut, Nogent-sur-Oise, France, assignors, by mesne assignments, to Etablissements Kuhlmann, Paris, France, a corporation of France
No Drawing. Filed July 10, 1962, Ser. No. 208,934
Claims priority, application France, Aug. 21, 1961, 871,188
7 Claims. (Cl. 8—25)

The present invention relates to new dyestuffs for synthetic fibres, especially fibres based on polyesters.

According to the present invention therefore, dyestuffs are provided which are represented by the general formula:

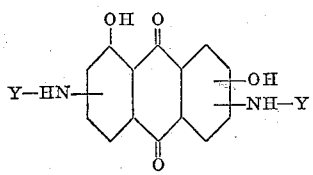

(I)

in which one Y represents a hydrogen atom and the other a 2-benzothiazolyl residue, possibly substituted in the 6 position by a nitro or amino group. The invention includes mixtures of these dyestuffs with one another.

The invention also includes a process for the preparation of dyestuffs of Formula I which comprises reacting a compound of the general formula:

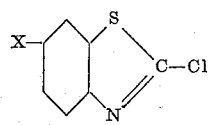

(II)

in which X represents a hydrogen atom or a nitro or amino group, with a diamino-dihydroxy-anthraquinone of the general formula:

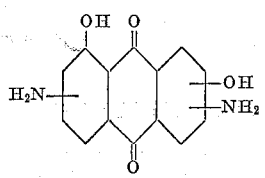

(III)

or with a mixture of anthraquinones of the Formula III.

Among anthraquinones of the general Formula III there may be mentioned, for example, 1,5-diamino-anthrarufin, 1,8-diamino-chrysazin, 2,6-diamino-anthrarufin, 2,8 - diamino-anthrarufin, 2,5 - diamino-chrysazin, and 2,7-diamino-chrysazin.

The reaction may be carried out, for example, in an organic solvent. It goes very well in phenol at a temperature between 140° C. and 200° C.

The mixtures of dihydroxy-diamino-anthraquinones of general Formula III that may be used for carrying out the process according to the invention may for example be obtained by nitration of anthrarufin, chrysazin or mixtures of these substances and subsequent reduction of the mixtures of nitro derivatives obtained. The nitration may be effected for example by means of fuming nitric acid or a mixture of sulphuric and nitric acids according to known methods.

The dyestuffs according to the invention are suitable for the colouration of synthetic fibres, especially fibres based on polyesters. By "fibres based on polyesters" are meant the fibres obtained by polycondensation of terephthalic acid with ethylene glycol. Such fibres are known on the market for example under the names of "Tergal," "Dacron," and "Terylene." The new dyestuffs have a very good affinity for these fibres, which they colour in full-bodied shades; the latter are also characterised by their excellent fastness to light and sublimation.

The following examples, in which the parts given are parts by weight, illustrate the invention without limiting it.

Example 1

11 parts of a mixture containing 5.5 parts of 1,5-diamino-anthrarufin and 5.5 parts of 1,8-diamino-chrysazin are gradually dissolved in 80 parts of melted phenol. This mixture is then heated to 150° C. As soon as this temperature is reached, 8.2 parts of 2-chloro-benzothiazole are added and the reaction is continued for 24 hours during which the temperature is maintained at 150° C. to 160° C. After cooling to 70° C., 1000 parts of ethyl alcohol are added and the mixture is filtered. The precipitate is then washed with alcohol until the washings are colourless, and is drained and dried. 13.7 parts of a blue powder are thus obtained, the elementary analysis of which is established as follows.

Calculated for $C_{21}H_{13}N_3O_4S$: C, 62.3%; H, 3.22%; N, 10.4%; S, 7.92%. Found: C, 61.61%; H, 3.45%; N, 10.21%; S, 8.21%.

The dyestuff, previously dispersed, dyes fibres based on polyesters a bright blue which is very fast to light and to sublimation.

Example 2

If in Example 1 the 2-chloro-benzothiazole is replaced by 10.3 parts of 2-chloro-6-nitro-benzothiazole, the dyestuff obtained dyes fibres based on polyesters a blue slightly greenish shade which is very fast to light and to sublimation.

Example 3

On replacing the 2-chloro-benzothiazole in Example 1 by 8.9 parts of 2-chloro-6-amino-benzothiazole, there are obtained 15.85 parts of a dyestuff which dyes fibres based on polyesters a reddish blue shade endowed with good fastness.

Example 4

5.4 parts of 1,8-diamino-chrysazin are reacted with 3.75 parts of 2-chloro-benzothiazole in solution in 40 parts of phenol in accordance with the process of Example 1. 7.85 parts of a blue powder are obtained which, after dispersion, dyes fibres based on polyesters a reddish blue shade which has very good fastness to light.

Example 5

10 parts of anthrarufin are introduced in small portions and with stirring into 40 parts of 48° Bé. nitric acid at a temperature of 0° C. to 3° C. Stirring is continued for 4 hours while the temperature is maintained at about 0° C., then the mixture is introduced into 500 parts of ice water. The nitro derivatives which precipitate are filtered off, washed until neutral and dried. 12.1 parts of an orange-yellow powder are obtained; this is introduced into 242 parts of a 5% solution of sodium sulphide and reduced for 1 hour at 90° C. to 95° C. After cooling, the diamino derivatives are precipitated by the addition of ammonium chloride, filtered off, washed and dried. 9.4 parts of a mixture consisting essentially of 4,8-diamino-, 2,8-diamino-, and 2,6-diamino-anthrarufins are obtained; elementary analysis gave the following results.

Calculated for $C_{14}H_{10}O_4N_2$: N, 10.36%. Found: N, 10.41%.

6 parts of this mixture of diamino-anthrarufins are dissolved gradually in 40 parts of melted phenol. This solution is then heated to 120° C. When this temperature is reached, 4.1 parts of 2-chloro-benzothiazole are introduced and the reaction is continued for 22 hours while the temperature is raised to about 150° C. to 160° C. After cooling to 70° C., 500 parts of ethyl alcohol are added and the precipitate is filtered off, then washed with boiling alcohol until the washings are colourless, drained and dried. 8.2 parts of a brown powder are thus obtained, the elementary analysis of which gave the following results.

Calculated for $C_{21}H_{13}O_4N_3S$: N, 10.4%; S, 7.92%. Found: N, 10.20%; S, 8.50%.

This powder, previously dispersed, dyes fibres based on polyesters a full-bodied violet shade which is very fast to light and to sublimation.

*Example 6*

19.2 parts of anthrarufin are dissolved in 180 parts of sulphuric acid of density 1.67, then 20 parts of a mixture of sulphuric and nitric acids are added while the temperature is prevented from rising above 50° C. The nitration is then carried on for 5 hours at room temperature. The solution is introduced into 1200 parts of ice water, and the precipitate obtained is filtered off, washed until neutral and drained. It is dissolved in 800 parts of a 7% solution of sodium sulphide. The mixture is heated for an hour at 90° C., filtered hot and washed with 600 parts of boiling water. The diamino-anthrarufins are precipitated in the filtrates by the addition of sodium bicarbonate, filtered off, washed until neutral and dried. 10.2 parts of a brown powder are thus obtained, the greater part of which consists of 2,6-diamino- and 2,8-diamino-anthrarufin.

5.4 parts of this mixture are treated with 3.75 parts of 2-chloro-benzothiazole in 40 parts of phenol, in accordance with the process described in Example 5. 6.6 parts of a brown powder are obtained which, after dispersion, dyes fibres based on polyesters a red-violet shade possessing excellent fastness to light and sublimation.

*Example 7*

If the 5.4 parts of diamino-anthrarufin in Example 6 are replaced by 3.8 parts of diamino-anthrarufin prepared by the process described in Example 6 and 1.6 parts of 4,8-diamino-anthrarufin, 7 parts of a mixture of dyestuffs are obtained which dyes fibres based on polyesters a violet shade similar to that obtained in Example 5 and having very good fastness to light and sublimation.

*Example 8*

If 19.2 parts of chrysazin are used in Example 6 instead of 19.2 parts of anthrarufin, 4.7 parts of a mixture consisting principally of 2,7-diamino- and 2,5-diamino-chrysazin are obtained. When treated under the same conditions it gives 6.4 parts of a mixture of dyestuffs which dyes fibres based on polyesters a violet blue shade which is very fast to light and sublimation.

*Example 9*

The procedure is as in Example 5 but with chrysazin instead of anthrarufin. A mixture of dyestuffs is obtained which dyes fibres based on polyesters a reddish blue shade having very good fastness to sublimation.

We claim:
1. Dyestuffs mixtures of the general formula:

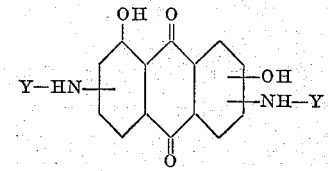

(I)

in which one Y represents a hydrogen atom and the other Y represents a member selected from the group consisting of the 2-benzothiazolyl residue, the 2-benzothiazolyl residue substituted in the 6 position by a nitro group and the 2-benzothiazolyl residue substituted in the 6 position by an amino group.

2. Mixtures of dyestuffs of the general formula given in claim 1.

3. Mixtures of dyestuffs consisting of N-(2-monobenzothiazolyl)-1,5-diamino-anthrarufin and N-(2-monobenzothiazolyl)-1,8-diamino-chrysazin.

4. The mixture of dyestuffs consisting of N-(2-monobenzothiazolyl)-4,8-diamino-anthrarufin, N-(2-monobenzothiazolyl)-2,8-diamino-anthrarufin, and N-(2-monobenzothiazolyl)-2,6-diamino-anthrarufin.

5. Process for the preparation of dyestuffs which comprises reacting a compound of the general formula:

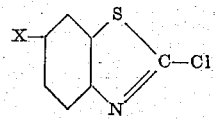

(II)

in which X represents a member selected from the group consisting of the hydrogen atom and the nitro and amino groups with at least one diamino dihydroxy anthraquinone of the general formula:

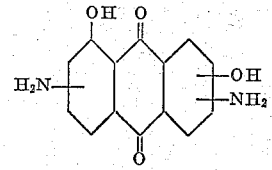

(III)

6. Process as claimed in claim 5 in which the reaction is effected in an organic solvent.

7. Process as claimed in claim 5 in which the reaction is effected in phenol at a temperature between 140° C. and 200° C.

References Cited by the Examiner

UNITED STATES PATENTS

| | | | |
|---|---|---|---|
| 2,060,186 | 11/36 | Felix | 8—25 |
| 2,099,673 | 11/37 | Beard | 260—303 |
| 2,342,191 | 2/44 | Grossmann | 8—25 |
| 2,899,438 | 8/59 | Jenny | 260—303 |
| 2,982,773 | 5/61 | Grossman | 260—377 |

OTHER REFERENCES

Review of Textile Progress, 1961, pp. 227–228, pub. 1962 by Butterworth & Co., Washington, D.C.

NORMAN G. TORCHIN, *Primary Examiner.*

ABRAHAM H. WINKELSTEIN, *Examiner.*

UNITED STATES PATENT OFFICE
CERTIFICATE OF CORRECTION

Patent No. 3,199,941                         August 10, 1965

André Albert Paul Simonnet et al.

It is hereby certified that error appears in the above numbered patent requiring correction and that the said Letters Patent should read as corrected below.

In the heading to the printed specification, line 11, after "871,188" insert --; Oct. 25, 1961, 876,975 --.

Signed and sealed this 19th day of April 1966.

(SEAL)
Attest:

ERNEST W. SWIDER                         EDWARD J. BRENNER
Attesting Officer                            Commissioner of Patents